(12) United States Patent
Fixman

(10) Patent No.: US 7,107,152 B2
(45) Date of Patent: Sep. 12, 2006

(54) WEATHER FORECAST ACCURACY VERIFICATION AND EVALUATION SYSTEM

(76) Inventor: Bruce A. Fixman, 2218 E. Rockledge Rd., Phoenix, AZ (US) 85048

( * ) Notice: Subject to any disclaimer, the term of this patent is extended or adjusted under 35 U.S.C. 154(b) by 0 days.

(21) Appl. No.: 10/835,135

(22) Filed: Apr. 28, 2004

(65) Prior Publication Data

US 2004/0215483 A1 Oct. 28, 2004

Related U.S. Application Data

(60) Provisional application No. 60/465,936, filed on Apr. 28, 2003.

(51) Int. Cl.
*G01W 1/00* (2006.01)
(52) U.S. Cl. .......................................................... 702/3
(58) Field of Classification Search .................... 702/2, 702/3, 4; 703/2, 5, 9
See application file for complete search history.

(56) References Cited

U.S. PATENT DOCUMENTS

| | | | | |
|---|---|---|---|---|
| 6,135,881 | A * | 10/2000 | Abbott et al. .................... | 463/3 |
| 6,473,084 | B1 * | 10/2002 | Phillips et al. .............. | 345/440 |
| 6,606,615 | B1 * | 8/2003 | Jennings et al. .............. | 706/45 |
| 6,658,467 | B1 * | 12/2003 | Rice et al. .................. | 709/224 |
| 6,792,399 | B1 * | 9/2004 | Phillips et al. ............ | 705/36 R |

OTHER PUBLICATIONS

Sep. 19, 2005 Printout of web page at http://www.ksdk.com/news/news_article.aspx?storyid=49129.*

Sep. 19, 2005 Printout of web page at http://64.233.187.104/search?q=cache:qz3PE-F1h04J:www.nashscene.com/cgi-bin/textonly.cgi%3Fstory%3DBack_Issues:2004:May_6-12_2004:News:Desperately_Seeking_the_News++%22+ Depends+on+who+pays+for+it%22&hl=en.*

Sep. 19, 2005 Printout of web page at http://news.enquirer.com/apps/pbcs.dll/article?AID=/20050305/LIFE/5030503409/19/05.*

* cited by examiner

*Primary Examiner*—Donald McElheny, Jr.
(74) *Attorney, Agent, or Firm*—Richard E. Oney; Tiffany & Bosco, P.A.

(57) ABSTRACT

A method and system verify the accuracy of weather forecasting entity, such as a television station, a radio station, newspaper or other the like. A weather forecast for the entity is obtained for a given geographic region and a given forecast time period, the forecast including a set of one or more forecast data elements. The set of forecast data elements is converted to a set of one or more numerical values. A set of one or more actual weather condition data elements is obtained for the given geographic region and period of time. The set of actual weather condition data elements is converted to a set of one or more numerical values. The set of actual weather condition numerical values is compared with the set of forecast numerical values. A forecast accuracy score is computed based on the comparison of the set of actual weather condition numerical values and the set of forecast numerical values. The accuracy of a weather forecasting entity is compared with that of a second weather forecasting entity by obtaining a weather forecast for the second weather forecasting entity for the given geographic region and forecast time period, the second forecast including a second set of forecast data elements. Scores for each television station within a market are compared with each other to determine the one station with the best score.

35 Claims, 11 Drawing Sheets

Each daily forecast spreadsheet (Diagram A) obtains "actual" data from hyperlinked spreadsheets (Diagram B).

Five-day scores are tracked each day of the month and a monthly average is computed.

|  | A | B | C | D | E | F |
|---|---|---|---|---|---|---|
| 1 |  | WBBM | WFLD | WGN | WLS | WMAQ |
| 2 | Mar | 2.93 | 3.75 | 3.39 | 2.18 | 3.43 |
| 3 | Apr | 4.34 | 2.67 | 3.56 | 2.01 | 1.22 |
| 4 | May | 2.05 | 4.68 | 5.63 | 4.77 | 3.54 |
| 5 | Jun | 1.03 | 3.56 | 4.56 | 3.67 | 6.94 |
| 6 | Jul | 1.99 | 4.56 | 2.45 | 3.06 | 5.03 |
| 7 | Aug | 2.25 | 4.06 | 6.03 | 6.23 | 3.55 |
| 8 | Spring-Summer Average | 2.43 | 3.88 | 4.27 | 3.65 | 3.95 |

Monthly scores are tracked and a rating-season average is computed. Figure 11

WEATHER FORECAST ACCURACY VERIFICATION AND EVALUATION SYSTEM

RELATED APPLICATION

This application claims the benefit of U.S. Provisional Application No. 60/465,936, filed Apr. 28, 2003, entitled "Weather Forecast Accuracy Verification and Evaluation System," which is incorporated herein by reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention pertains generally to systems and methods for verifying the accuracy of weather forecasts, and systems and methods for gathering, manipulating, evaluating and selling such data.

Weather affects every person on this planet. Current and forecast weather conditions affect commerce (e.g., transportation, construction, tourism, retail, agriculture), politics (weather on Election Day, war, political rallies), public safety and health (e.g., lightning at golf courses, avalanches in ski country, severe weather including hurricanes, tornadoes and blizzards, floods) and the general pursuit of happiness (virtually all outdoor activities, e.g. outdoor recreation, weddings, sports, hobbies).

In our society, many people obtain and rely on the weather forecasts they receive via the media—especially television. Studies have shown that the weather forecast is the primary reason people watch their local television news. In an effort to increase their Nielsen rating and/or market share, many television stations claim that their weather forecasts are the most accurate, pinpoint or simply the best in their locale. Television stations and other media outlets make these unfounded self-proclamations because they generate higher advertising revenue by obtaining higher ratings (e.g. Nielsen ratings). In a recent study, 52% of the people interviewed stated that they were likely or very likely to alter their viewing habits (e.g. change channels) to watch the television station that has been certified by an independent rating agency as the most accurate in their city. Other research studies have shown that forecast accuracy is critically important to news viewers. One unconfirmed study found that 50% to 70% of people believe that forecast accuracy is the most important aspect of the weathercast, when compared with talent and technology.

Before the present invention, there was no system or process in place to verify which television station or other media outlet was actually the most accurate in a particular market. What is desired, therefore, is a method and system that can be used to verify the accuracy of weather forecasting entities, such as television weathercasters. It is an object and feature of the present invention to provide such a system and method.

Additional objects and advantages of the invention will be set forth in the description that follows, and in part will be apparent from the description, or may be learned by practice of the invention. The objects and advantages of the invention may be realized and obtained by means of the methods and apparatus pointed out in the appended claims.

SUMMARY

To achieve the foregoing objects, and in accordance with the purposes of the invention as embodied and broadly described in this document, there is provided a method and system for verifying the accuracy of weather forecasting entity, such as a television station, a radio station, newspaper or other the like. According to the method a weather forecast for the entity is obtained for a given geographic region and a given forecast time period, the forecast including a set of one or more forecast data elements. The set of forecast data elements is converted to a set of one or more numerical values. A set of one or more actual weather condition data elements is obtained for the given geographic region and period of time. The set of actual weather condition data elements is converted to a set of one or more numerical values. The set of actual weather condition numerical values is compared with the set of forecast numerical values. A forecast accuracy score is computed based on the comparison of the set of actual weather condition numerical values and the set of forecast numerical values.

According to one advantageous method, the set of forecast data elements includes one or more of forecast high temperature, forecast low temperature, forecast sky condition, forecast precipitation type, forecast precipitation timing and forecast other weather phenomena. The forecast sky condition data element is selected from the group consisting of sunny, partly cloudy, mostly cloudy and cloudy. The forecast precipitation type data element is selected from the group consisting of rain, snow, ice, and mixed. The forecast other weather phenomena data element is selected from the group consisting of snow depth, strong wind, dense fog and severe thunderstorm. A forecast accuracy score is computed based on high temperature, low temperature, weather and weather additional data element points. The forecast time period is one day.

The accuracy of a weather forecasting entity can be compared with that of a second weather forecasting entity by obtaining a weather forecast for a second weather forecasting entity for the given geographic region and forecast time period, the second forecast including a second set of forecast data elements. The second set of forecast data elements is converted to a second set of one or more forecast numerical values. The set of actual weather condition numerical values is compared with the second set of forecast numerical values. A second forecast accuracy score is computed based on the comparison of the set of actual weather condition numerical values and the second set of forecast numerical values. The forecast accuracy score is then compared with the second forecast accuracy score.

A computer system for evaluating the accuracy of weather forecasting entities for a given geographic region includes a central processing unit (CPU), a forecast weather database operable with the CPU and comprising forecast weather data elements for a first weather forecasting entity and forecast data elements for a second weather forecasting entity and an actual weather database operable with the CPU and comprising actual weather data elements. At least one input device is operable to input weather forecasting data elements into the forecast weather database. The CPU being programmed to: convert the forecast weather data elements to one or more numerical values; convert the actual weather condition data elements to numerical values; compare the actual weather condition numerical values with the set of forecast numerical values; compute a forecast accuracy score for each of the first weather forecasting entity and the second weather forecasting entity based on the comparison of the actual weather condition numerical values and the forecast numerical values; and compare the forecast accuracy score for the first weather forecasting entity with the forecast accuracy score for the second weather forecasting entity.

Weather forecasts made and/or presented by television personalities are typically posted on a television station's website for general public use. These weather forecasts (high and low temperatures, sky condition, precipitation type and timing, and other weather phenomena) are obtained from a station's website. Preferably, a weathercaster may utilize an online forecast entry system to enter weather forecast data into the system. The non-numerical data (sky condition, precipitation type, precipitation timing and other weather phenomena) are assigned numerical values. Actual (e.g. observed) weather data is obtained from the National Weather Service or other reliable reporting agency. The forecast data is then compared with the observed actual weather. Through a series of mathematical algorithms, a point value is established for every television station's weather forecast for each day of the week. Daily point totals are added and a four-day average is established. This process is completed for each station in a given television market. At the end of a weather verification rating period, the scores for each television station within a market are compared with each other. The one station with the best score (the most accurate weather forecasts) can be offered the opportunity to purchase exclusive use of the verifying agency's name, logo and seal of approval for a specific length of time. In the event of a best score tie (two stations with identical scores), other factors including weathercaster presentation skills, appearance or meteorological knowledge may aid in determining which station receives the verifying agency's seal of approval.

BRIEF DESCRIPTION OF THE DRAWINGS

The accompanying drawings, which are incorporated in and constitute a part of the specification, illustrate the presently preferred embodiments of the invention and, together with the general description given above and the detailed description of the preferred methods and embodiments given below, serve to explain the principles of the invention.

FIG. 11 is display screen showing a typical rating-season tracking spreadsheet of the system of FIG. 8.

DESCRIPTION

In the following description, methods and embodiments of the invention has been shown and described simply by way of illustration of the best mode contemplated by the inventor of carrying out the invention. As will be realized, the invention is capable of modification in various respects, all without departing from the invention. Accordingly, the drawings and description are to be regarded as illustrative in nature, and not restrictive.

A television station's on-air weather presenter prepares his or her own local weather forecast, purchases the forecast from a weather forecasting company, or uses the forecast made by the National Weather Service. Some stations obtain their four-day website forecast from an outside source, such as the WeatherBug® weather data application marketed by AWS Convergence Technologies, Inc. of Gaithersburg, Md. Most television stations publish their prepared or vendor provided local four-day weather forecast to the station's website. Preferably, therefore, a station's four-day forecast can be obtained from the station's website, whether it is made in-house, by a vendor or by another third party. When a video of the weather presenter's forecast is posted on the station's website and the video is technically accessible, the four-day forecast may be obtained from the video.

Figure 1:
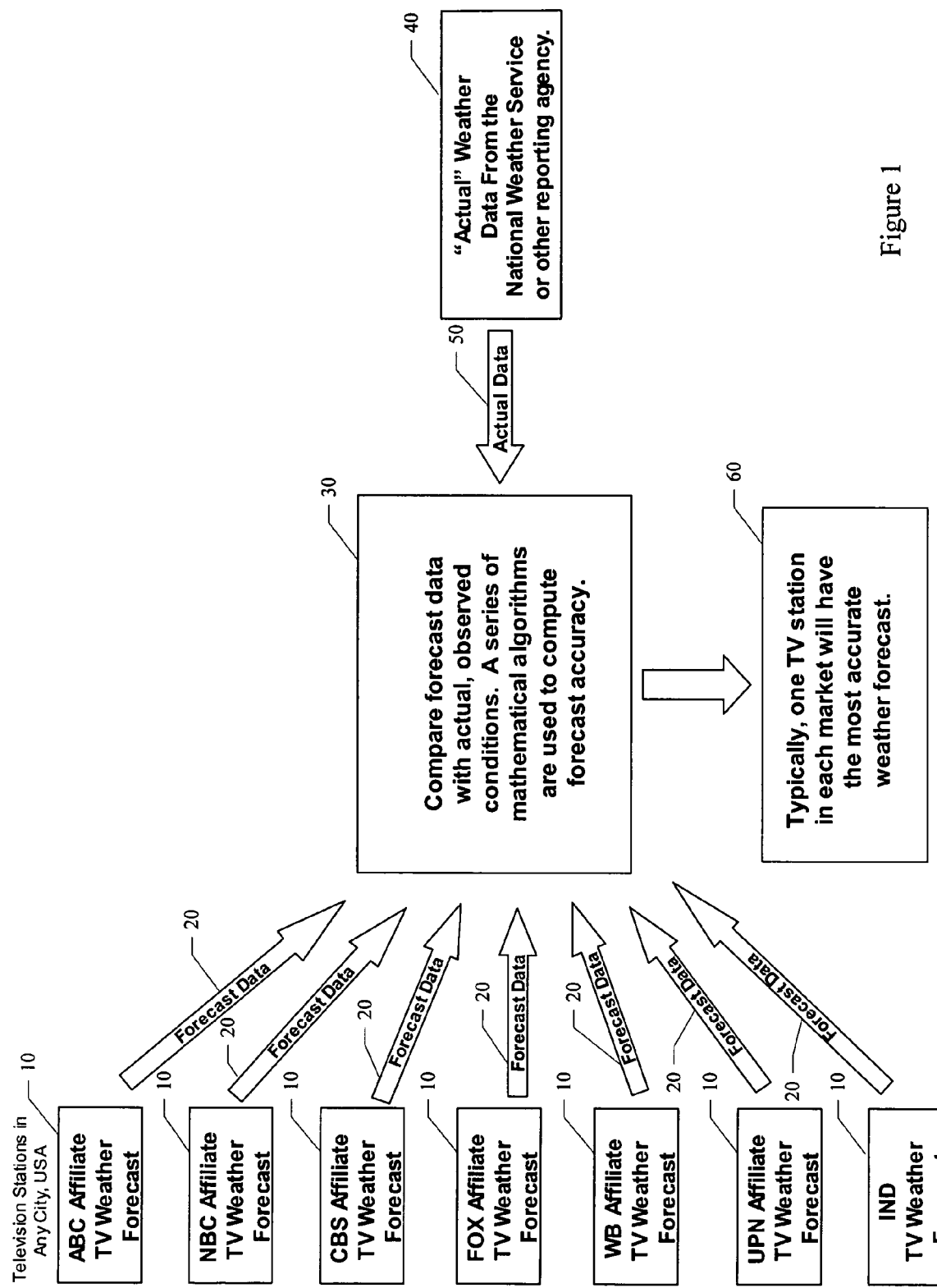
FIG. 1 is a functional diagram depicting a weather verification method according to the present invention.

Referring to FIG. 1, a functional diagram of a weather verification method according to the present invention is shown. Weather forecast data for a number of weather forecasting entities 10 is collected (step 20). In the exemplary method of FIG. 1, the forecasting entities 10 are television stations that broadcast local news in a given Direct Market Area (DMA). The television stations 10 can include network affiliates, such as the ABC, NBC, CBS, FOX, WB and UPN affiliates, as well as independent and cable television stations. Preferably, the forecast data for each station includes daily forecast data (i.e., the forecast time period is one day) and the daily forecast data is collected for multiple consecutive forecast time periods, such as a four-day period. Preferably, forecast data is obtained 365 days per year. Actual (observed) weather data 40 is obtained (step 50) for the given forecast time periods. According to a preferred method, the actual weather data 40 is obtained from the National Weather Service or other reporting agency. The forecast weather data is then be compared with the actual weather data and a series of algorithms is used to compute the accuracy of the forecast weather data 30. Typically, one forecasting entity 10 in each DMA will have the most accurate weather forecasting 60.

Figure 2:
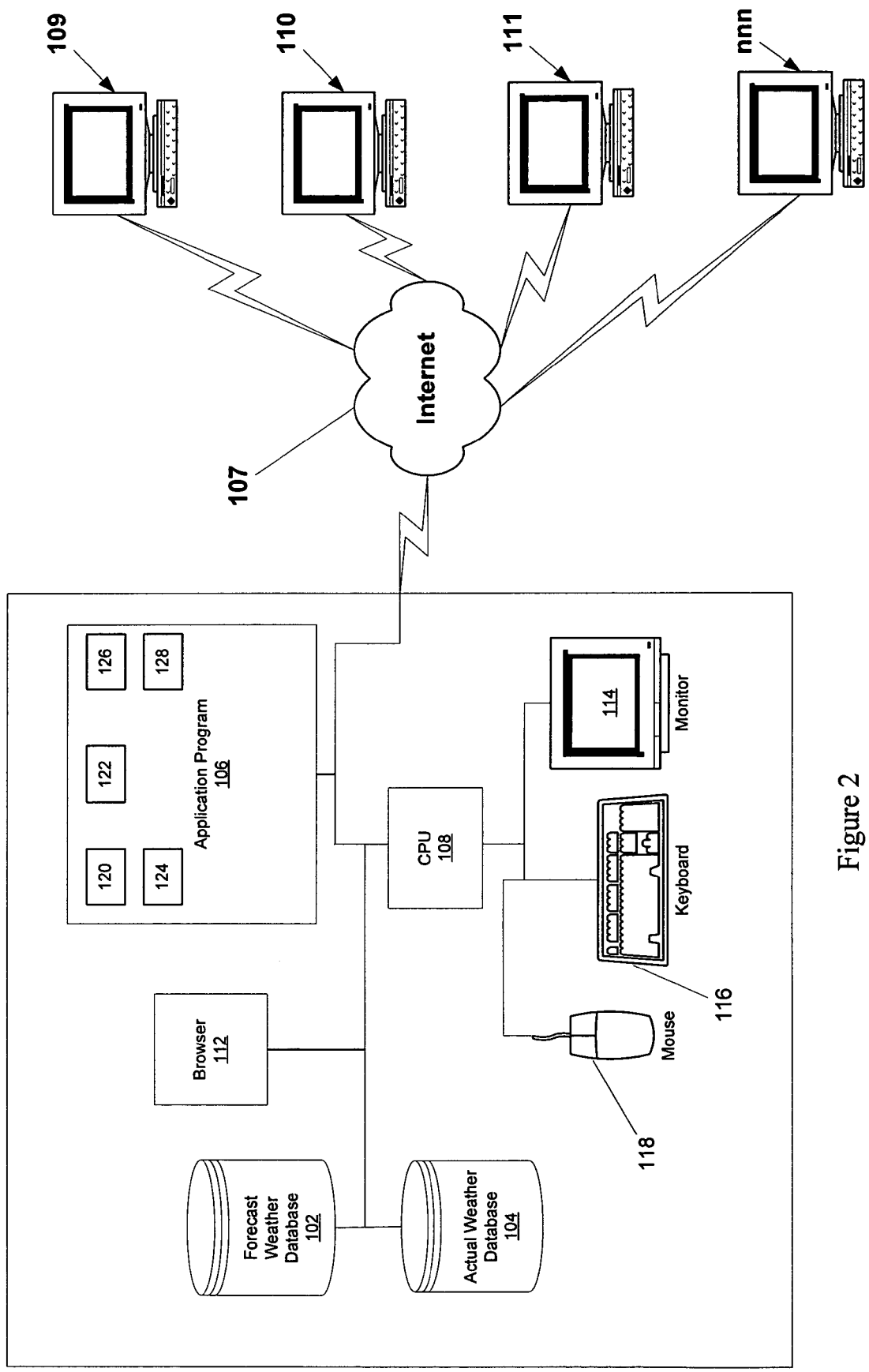
FIG. 2 is a functional block diagram of a preferred computer network system for practicing the present invention, showing a web server connected to other computer systems via the Internet, according to a preferred embodiment of the present invention.

FIG. 2 illustrates a preferred computer network system 100 for practicing the present invention on line. The system includes a computer system 101. The computer system 101 includes a central processing unit (CPU) 108 for processing data and program instructions. The computer system 101 also includes input and output devices, as is well known in the art. For example, the computer 101 preferably includes a display screen or monitor 114, a keyboard 116, a mouse 118, a printer (not shown), etc. The computer system 101 further includes data storage and memory devices, as are known in the art, for storing a forecast weather database 102, an actual weather database 104, an application program 106 and a browser 112. The forecast weather database 102 is used to store and manage forecast weather data. The actual weather database 104 is used to store and observed weather data. The databases 102 and 104 are relational databases, as are well known in the art. The web server 101 is connected to a network 107, which serves as a communications medium with user computers 109, 110, 111 and nnn (where nnn refers to any number of users). In presently preferred embodiments of the invention, the network 107 comprises the Internet. The Internet is a global network of computers. One popular part of the Internet is the World Wide Web, or the "Web." The World Wide Web contains computers that display graphical and textual information. Computers that provide information on the World Wide Web are typically called "web sites." A website is defined by an Internet address that has an associated electronic page, often called a "home page." Generally, a home page is an electronic document that organizes the presentation of text, graphical images, audio and video into a desired display. Upon reading this specification, those skilled in the art will now understand that, under appropriate circumstances, considering issues such as developments in computer hardware, software and connectivity, etc., other network configurations and devices also may suffice, such as for example, PDAs connected via a wireless network, etc.

Still referring to FIG. 2, the computer system 101 is configured according to a preferred embodiment of the invention to include a web server for hosting a website, which includes a homepage 120, a module for user registration and login 122, a module for online forecast data entry 124, a module for bulk forecast data entry 126 and a module for actual (observed) weather data entry 128. Upon reading this specification, those skilled in the art will understand that, under appropriate circumstances, considering issues such as user preference, services offered by website manager, market demand, subject area, etc., other functional modules may be included, such as for example, a module for implementing an amateur weather forecasting contest. The application program 106 is operable with the forecast weather database 102 and the actual weather database 104 to provide the functionality that will now be described.

Figure 3:
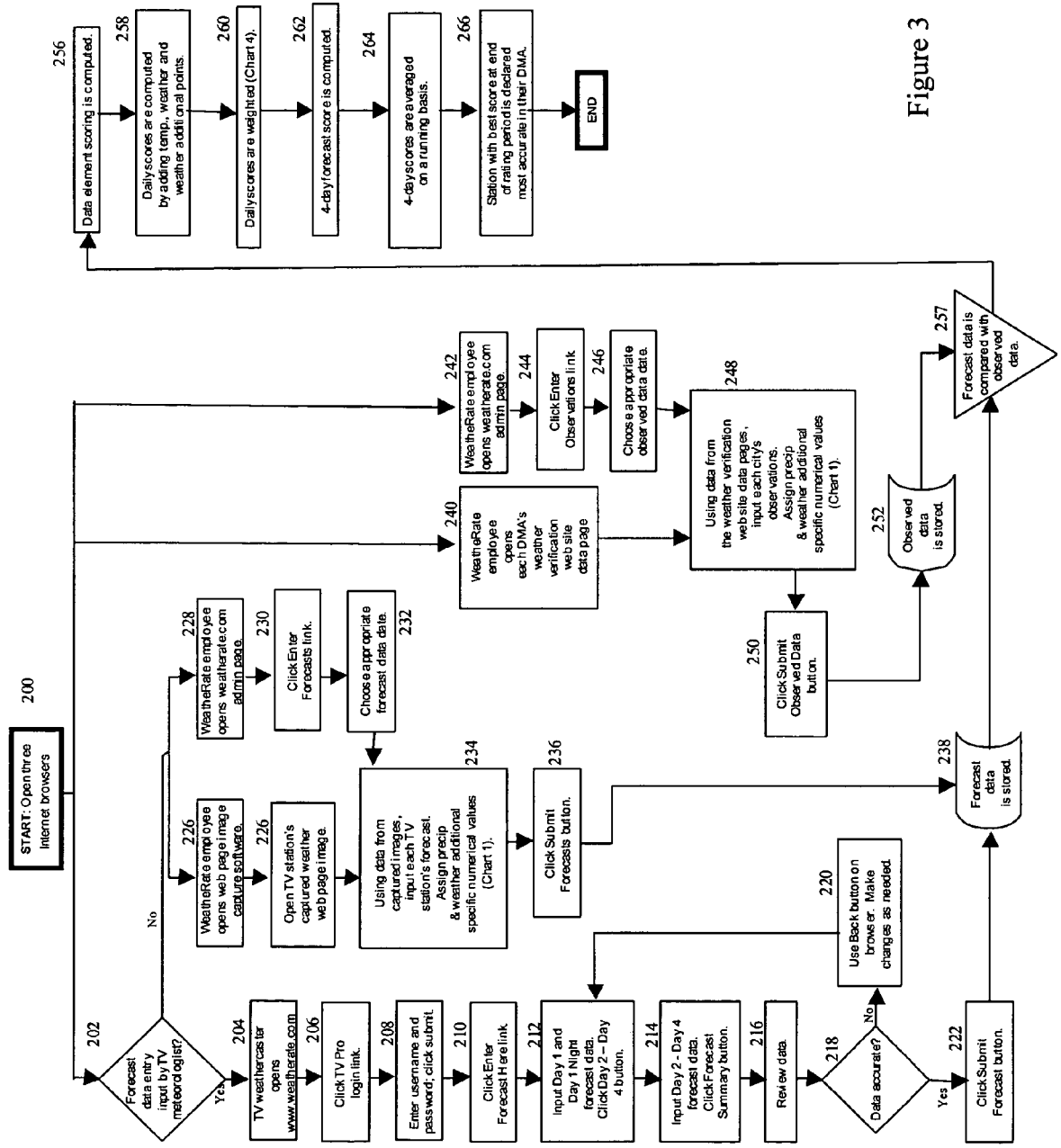
FIG. 3 is a flowchart describing the operation of the system of FIG. 2 in practicing and the weather verification process of FIG. 1.
Figure 4:
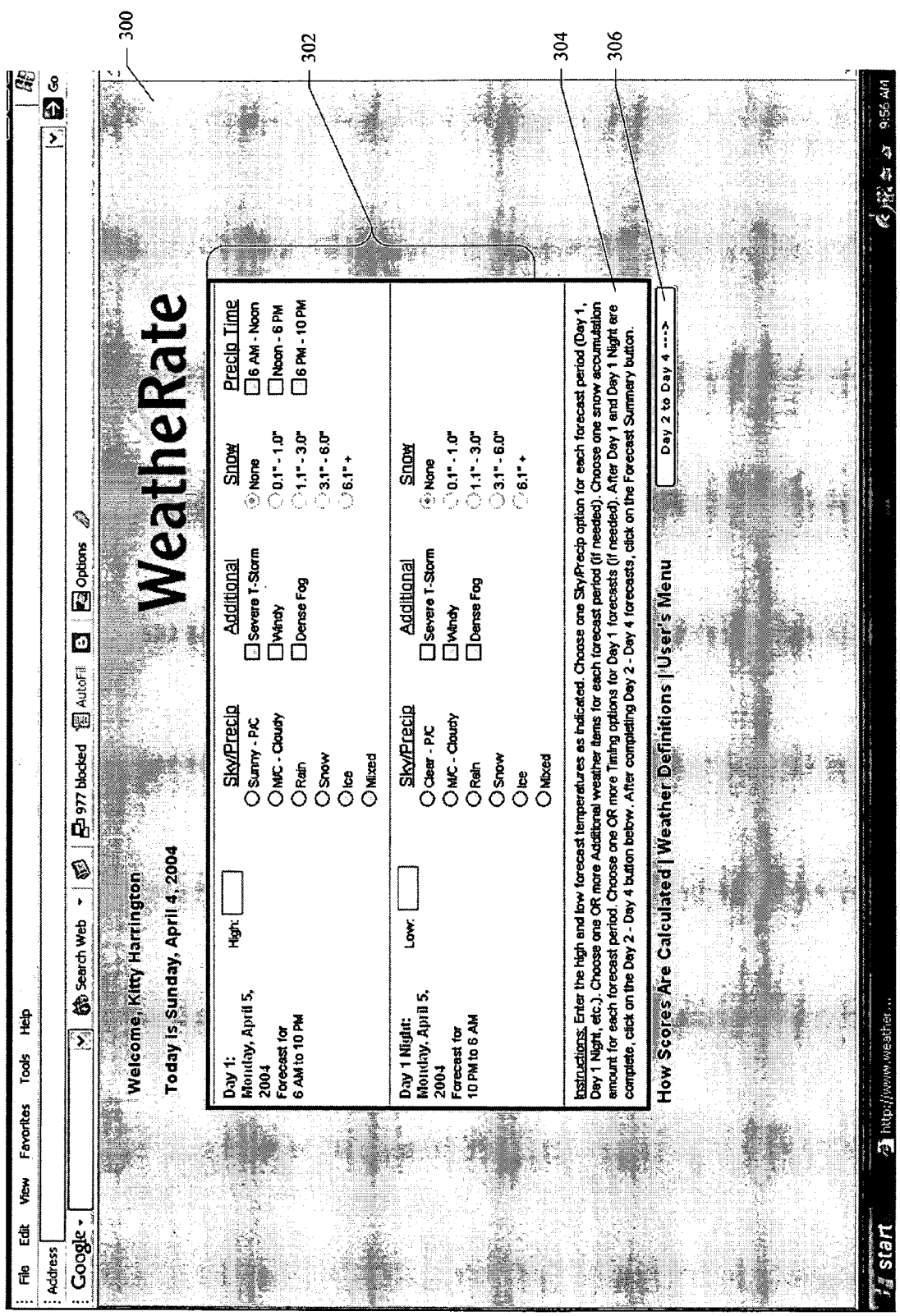
FIG. 4 shows an exemplary display of a screen for inputting forecast data into the system of FIG. 2.

Operation of the system 100 will now be described with reference to the flowchart shown in FIG. 3 and the interface depicted in FIGS. 4–7. As shown in FIG. 3, forecast data can be obtained one of two ways: by extracting the data from a station's weather web page, or by having the weathercaster use the invention's online (web-based) forecast entry system. An operator of the server system 100 begins by opening three Internet browser sessions (step 200). When a weathercaster utilizes the online forecast entry system 122 (step 202), he or she proceeds by opening the website homepage (step 204). The weathercaster may then access the online forecast entry system 122 via the Internet 107 by using one of the user computers 109, 110, 111 and nnn. The weathercaster navigates a series of links on the website and enters a username and password (steps 206–210) and the online forecast entry system 122 displays an input screen 300 for inputting forecast data. FIG. 4 shows an exemplary input screen 300 for inputting forecast data using the online forecast entry system 122. The input screen 300 includes a data input section 302, instructions for use 304 and a continuation button 306 for entering forecast data for additional days of a multi-day forecast. When the weathercaster's user computer browser displays the input screen 300, the weathercaster may then input his or her forecast data by following online instructions 304 (steps 212–214).

When the forecast data has been input, the weathercaster will have an opportunity to review the forecast data (step 216). If an error is noted (step 218), the weathercaster may use the "Back" button on the weathercaster's browser (step 220) to access the forecast entry form 300 that contains incorrect data (steps 212–214). The weathercaster may then make desired changes. When the weathercaster is satisfied that the forecast data is accurate, he or she may click the "Submit Forecast" button (not shown) (step 222). The forecast data is then stored in the forecast database (step 238).

Figure 5:
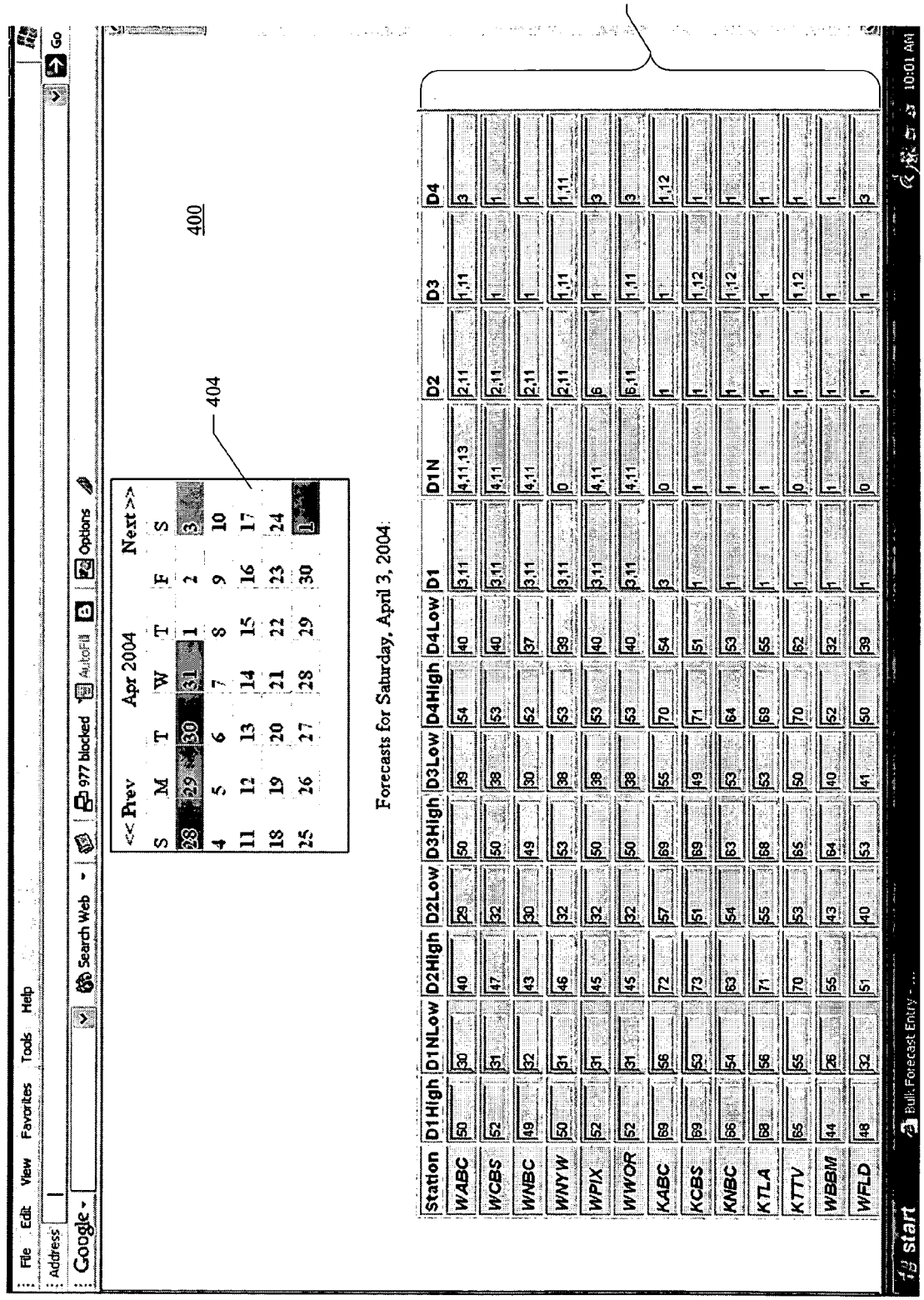
FIG. 5 shows an exemplary display of a screen for entering bulk forecast data into the system of FIG. 2.

When a weathercaster does not utilize the online forecast entry system (step 202), an alternative data entry system may be used. An operator using this method can open a third-party, web image capture software program (step 224). One such suitable software program is the Offline Explore Pro™ program marketed by MetaProducts Corporation of Columbus, Ohio. This program allows the operator to automatically capture and store web images from weathercaster home pages at set times. The operator may then open the captured image of a station's weather web page 226. In a separate window, the operator may also access the invention's website administrative page 228. The operator can then access the invention's bulk forecast entry system 126 by navigating a series of links and entering a username and password (step 230). FIG. 5 shows an exemplary bulk forecast entry screen 400. The bulk forecast entry screen 400 includes a data input section 402, for entering forecast data for weather forecasting entities and a calendar section 404 that allows the operator to choose the appropriate forecast date. When the operator's browser displays the bulk forecast entry screen 400, the operator selects the appropriate forecast date or dates (step 232).

The forecast data entered into the system includes weather data elements, i.e. variables used to describe the state of the atmosphere that may include sky cover (sunny, partly cloudy, mostly cloudy, cloudy) and/or precipitation (rain, thunderstorm, snow, mixed precipitation, or ice). Preferred forecast weather data elements include: forecast high temperature, forecast low temperature, forecast sky condition, forecast precipitation type and timing, and forecast other weather phenomena. "Temperature" refers to the degree of heat or cold of the atmosphere for a specific geographic location, measured in Fahrenheit, Celsius, Kelvin or other unit. Sky conditions may include sunny, partly cloudy, mostly cloudy and cloudy. Precipitation may include rain, snow, ice, and mixed (a combination of rain, snow and/or ice). Other forecast data entered into the system include weather additional data elements, i.e. variables used to describe other weather phenomena or the state of the atmosphere beyond the scope of weather data elements. Weather additional data elements may include, for example, windy, fog and/or severe thunderstorm. Preferred weather additional data elements include snow depth, strong wind, dense fog and severe thunderstorm.

Forecast weather data elements may be specific or abstract. For example, temperature high and low are forecast data elements that are specific because they have specific values, i.e. 94 degrees. "Partly cloudy" or "fog" are abstract because they generally are forecast without a specific numerical or other associative value. In other words, they are non-numeric conditions. Specific, numerical values may be assigned to the abstract forecast data elements including sky condition, precipitation and other weather phenomena to allow for data calculation and manipulation. Assigning specific numeric values to abstract forecast data elements will create a homogeneous numerical format that will allow for computations later in the weather verification process. Under appropriate circumstances, the specific data elements such as a temperature of 94 may also be converted to an alternative numerical value, such as may be desired for standardization of temperatures (i.e. Celsius, Fahrenheit, Kelvin), or other purposes. Moreover, all forecast data elements are converted, as necessary, to a homogeneous numerical format.

While there are many methods available for converting non-numerical data to a usable format, one preferred conversion format is set forth in Chart 1:

CHART 1

| Abstract Weather Event | Assigned Specific Numerical Value |
|---|---|
| Sunny (Clear) | 1 |
| Partly Cloudy | 1 |
| Mostly Cloudy | 2 |
| Cloudy | 2 |
| Rain | 3 |
| Snow | 4 |
| Ice | 5 |
| Mixed | 6 |
| Morning | 7 |
| Afternoon | 8 |
| Night | 9 |
| Severe Thunderstorm | 10 |
| Strong Wind | 11 |
| Dense Fog | 12 |
| Snow 0.1" to 1.0" | 13 |
| Snow 1.1" to 3.0" | 14 |
| Snow 3.1" to 6.0" | 15 |
| Snow >6.0" | 16 |

Referring again to FIG. 3, using data from the captured web image, the website operator inputs forecast data elements into the bulk forecast entry system (step 234). The operator may then click on a "Submit Forecast" button (not shown) on the bulk forecast entry screen 400 (step 236). The forecast data is then stored in the forecast weather database 102 (step 238).

Figure 6:
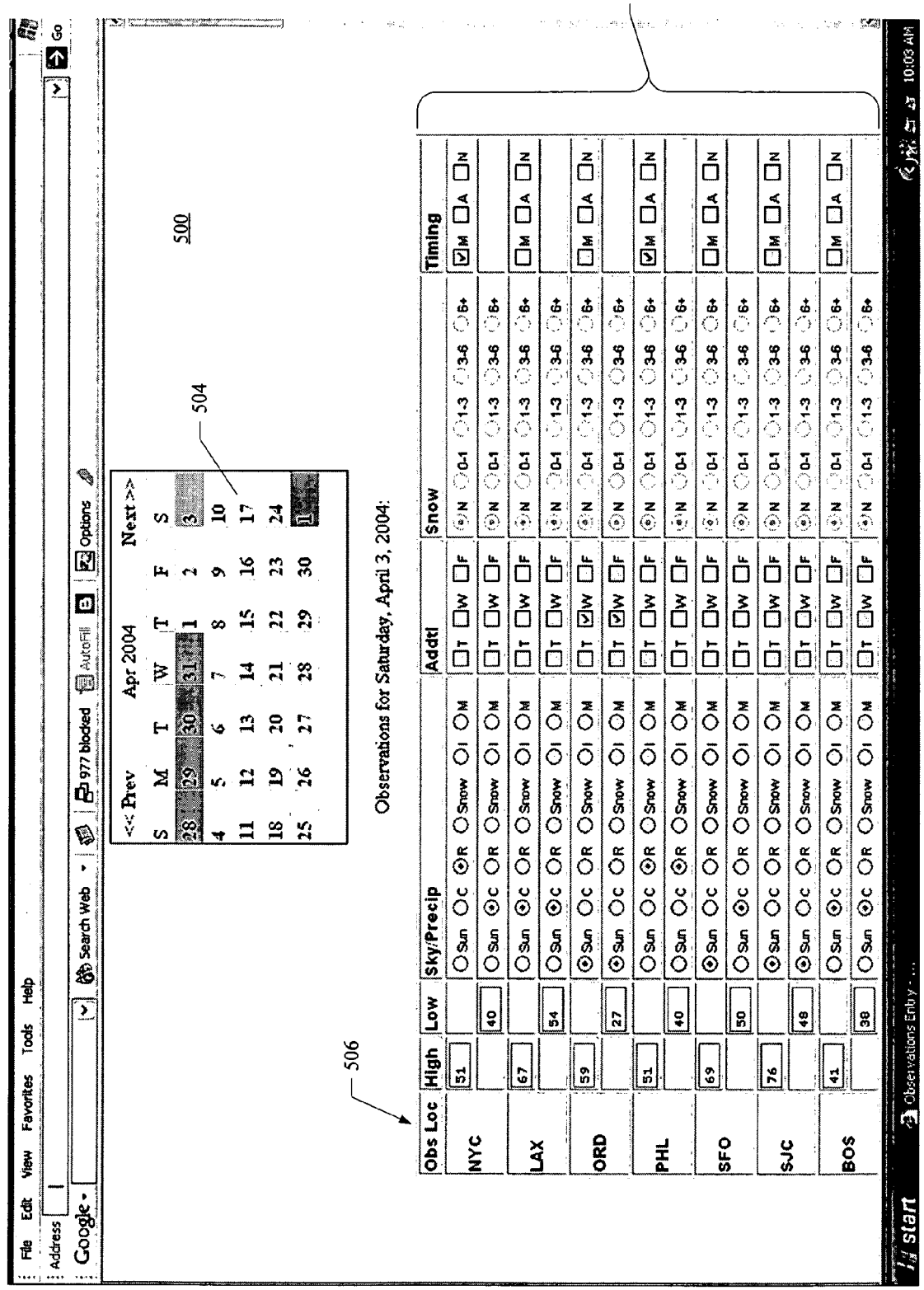
FIG. 6 shows an exemplary display of a screen for entering actual (observed) weather data into the system of FIG. 2.

As previously discussed, the actual (observed) weather conditions that transpire in a DMA are obtained from the National Weather Service or other reporting agency. Referring again to FIG. 3, the actual (observed) weather data is entered into the system 100 by accessing a website that publishes the desired actual weather statistics and displaying those actual weather conditions (step 240). In a new browser window, the system operator may access the actual (observed) weather data entry system 128. The operator may access the actual (observed) weather data entry system 128 by navigating a series of website links and entering a username and password (steps 242–244). FIG. 6 shows an exemplary input screen 500 for actual weather data entry. The actual weather data entry screen 500 includes a calendar section 504 that allows the operator to choose the appropriate date for the actual weather data to be entered. The actual weather data entry screen 500 also includes a data entry section 502 for entering the actual weather data for specific observation locations 506. When the operator's browser displays the actual weather data entry screen 500, the operator selects the appropriate observed weather data date (step 246).

The actual (observed) data may include the following weather condition data elements: actual high temperature, actual low temperature, actual sky condition, actual precipitation type and timing and actual other weather phenomena. Sky conditions may include sunny, partly cloudy, mostly cloudy and cloudy. Precipitation may include rain, snow, ice and mixed (a combination of rain, snow and/or ice). Other weather phenomena may include snow depth, strong wind, dense fog and severe thunderstorm.

As noted above, actual weather condition data elements may be specific or abstract. For example, temperature high and low are forecast data elements that are specific because they have specific values, i.e. 94 degrees. "Partly cloudy" or "fog" are abstract because they are generally reported in a non-numeric form. Numerical values may be assigned to abstract actual weather condition data elements including sky condition, precipitation type and timing, and other weather phenomena to allow for data calculation and manipulation; refer to Chart 1 above for details. Moreover, all actual weather condition data elements are converted, as necessary, to a homogeneous numerical format.

While there are numerous interpretations of observed weather conditions (sky cover, precipitation and other weather phenomena), one preferred set of definitions is set forth in Chart 2:

CHART 2

| Actual Weather Condition | Definition |
|---|---|
| Sunny (Clear) | Greater than 75% of possible sunshine, or 0 to 0.2 sky cover during the forecast period. |
| Partly Cloudy | 35% to 75% possible sunshine, or 0.3 to 0.6 sky cover during the forecast period. |
| Mostly Cloudy | 15% to 34% possible sunshine, or 0.7 to 0.8 sky cover during the forecast period. |
| Cloudy | Less than 15% possible sunshine, or 0.9 to 1.0 sky cover during the forecast period. |
| Rain | One-hundredth of one inch (.01") or greater during the forecast period. |
| Snow | One-tenth (0.1") accumulation or greater during the forecast period. |
| Ice | Sleet or freezing rain is predominant weather event during the forecast period. |
| Mixed | A mixture of rain, sleet, freezing rain or snow during the forecast period. |
| Strong Wind | Average forecast period wind speed is 14 mph or greater, or five consecutive forecast period hours with wind gusts of 20 mph or greater. |
| Dense Fog | Visibility one-quarter mile or less for at least four hours during the forecast period. |
| Severe Thunderstorm | Follows National Weather Service criteria: wind gust of 58 mph or stronger, or hail three quarters of an inch (¾") or larger. |

Referring again to FIG. 3, the actual (observed) data is then input into the observed weather database (step 248). The user may click the "Submit Observed Data" button (not shown) (step 250). The observed data is then stored in the actual weather database 104 (step 252).

After steps 238 and 252 are complete, the system 100 has stored specific values for the forecast data elements and actual (observed) weather condition data elements entered in the respective databases 102, 104. Further, all data elements, including abstract types, are represented numerically. The system can then compare the specific value of each forecast data element (forecast high temperature, forecast low temperature, forecast sky condition, forecast precipitation type and timing and forecast other weather phenomena) with the specific value of each corresponding actual weather condition data element (actual high temperature, actual low temperature, actual sky condition, actual precipitation type and timing and actual other weather phenomena (step 254). High temperature, low temperature, weather and weather additional data element points are then computed (step 256). While there are numerous methods available to compute scores, a preferred method for scoring is set forth in Chart 3:

CHART 3

| Item | Scoring Process |
|---|---|
| High and Low Temperature | Absolute value of (the forecast temperature minus the actual temperature)/2 |
| Sky Cover/Precipitation Type | Zero points when correctly forecasting sky cover and/or precipitation type. Plus four points when incorrectly forecasting sky cover and or precipitation type. |
| Precipitation Timing | Zero points when correctly forecasting precipitation timing. Plus one and one-half points for each incorrect precipitation timing forecast. |
| Severe Thunderstorm | Zero points when correctly forecasting severe thunderstorms. Plus four points when incorrectly forecasting severe thunderstorms. |
| Strong Winds | Zero points when correctly forecasting strong wind. Plus two points when incorrectly forecasting strong wind. |
| Dense Fog | Zero points when correctly forecasting dense fogs. Plus two points when incorrectly forecasting dense fog. |
| Snow Accumulation | Zero points when correctly forecasting snow accumulation. Plus four points when incorrectly forecasting snow accumulation. |

If a forecast data element is missing for a particular forecast, it is scored as an incorrect forecast. For example, if the sky cover data element is missing, it is scored as plus four points. When comparing two or more scores in this scoring method, the lowest evaluated score indicates the most accurate forecast.

Preferably, the forecast time period is for all or part of a 24-hour period, i.e. the forecast weather data is for a given day or portion thereof. Scores for each period are computed by adding temperature, weather and weather additional data element points (step 258), then multiplying the total by a weighting factor (step 260). Preferably, scores are computed for multiple successive periods. For example, according to one preferred method, scores are computed for five consecutive periods covering four days (with the first period being the daytime forecast for the first day and the second period being the nighttime forecast for the first day. The scores for each period are weighted because the first and second periods of an extended forecast are often more important to most people than the fourth or fifth periods of an extended forecast. Other weighting methods can be used to give weight to different factors. For example, more weight can be given to forecast periods covering holidays and weekends. While there are numerous methods available to weight scores, a preferred method for weighting scores is set forth in Chart 4:

CHART 4

| Forecast Period | Weighting Factor |
|---|---|
| One | Daily point total multiplied by 2 |
| Two | Daily point total multiplied by 1.25 |
| Three | Daily point total multiplied by 1 |
| Four | Daily point total multiplied by 0.75 |
| Five | Daily point total multiplied by 0.5 |

Using this weighting method, the weighted four-day score is computed (step 262). Four-day scores are then averaged on a running basis (step 264).

Figure 7:
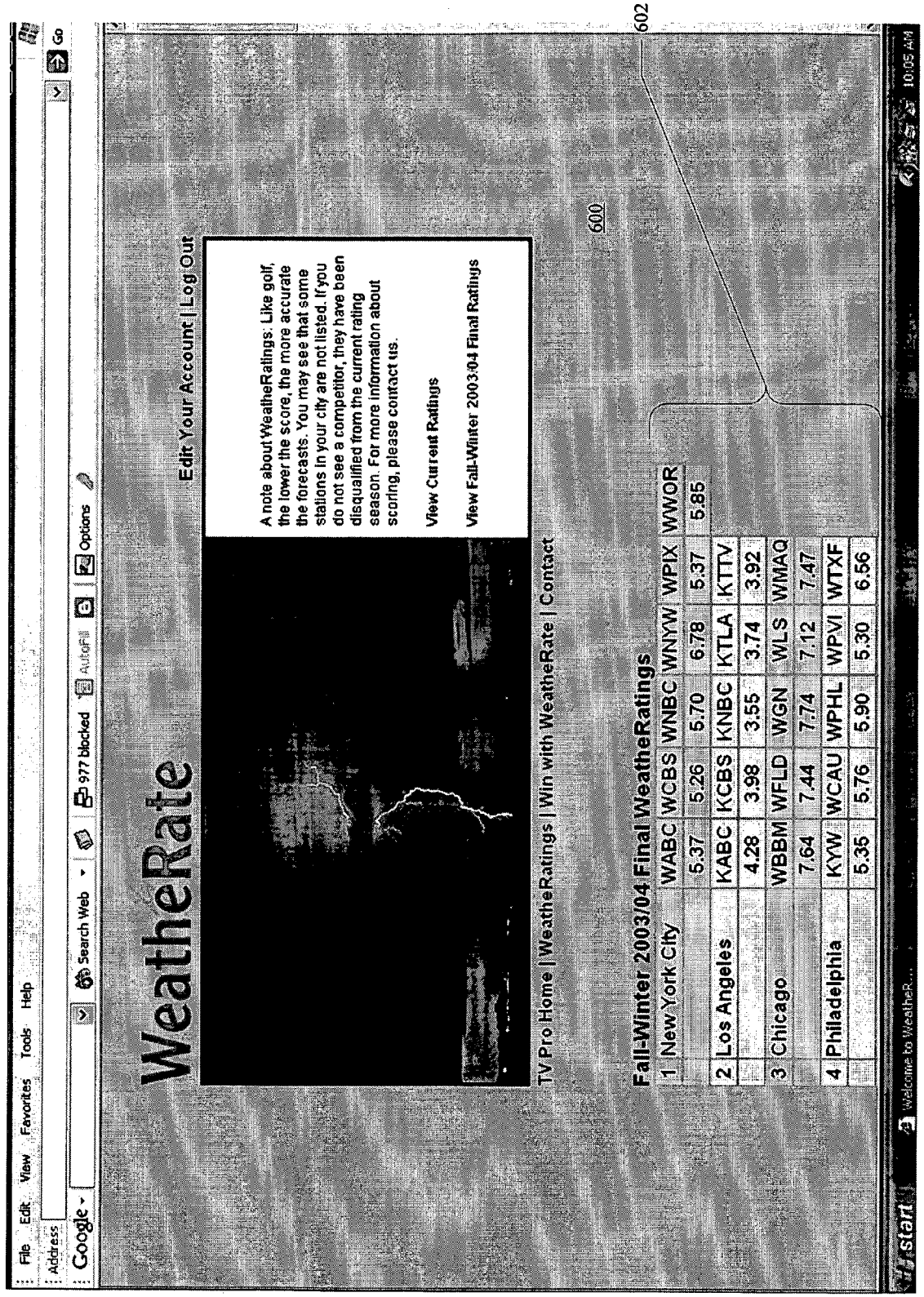
FIG. 7 shows an exemplary display of a screen viewing weather forecast accuracy scores computed by the system of FIG. 2 for television stations.

Scores of forecasting entities can be used to compare the forecasting accuracy of the entities to each other. These scores can be posted for comparison, such as is shown in FIG. 7 for television stations in particular cities. Typically, the television station with the best score is declared the most accurate in a particular DMA (step 266). The most accurate television station in each DMA may be offered the opportunity to purchase exclusive use of the verifying agency's name, logo and/or seal of approval for a specific length of time. In the event of a best score tie (two stations with identical scores), other factors may aid in determining which station receives the verifying agency's seal of approval. Such factors may include, for example, weathercaster presentation skills and/or meteorological knowledge.

An alternative system according to the invention can be implemented using a computer system running a spreadsheet application program for storing and managing the forecast weather data and actual weather data and for performing the necessary calculations. In such a system, a stored spreadsheet provides at least one workbook for each geographic region to be evaluated, at least one worksheet for each forecasting entity in that geographic region, and a worksheet for actual weather data recorded in the geographic region. More specifically, the spreadsheet provides at least one sheet to act as a forecast database for each forecast entity. In addition, the spreadsheet provides a sheet to act as an actual weather database. Because the actual weather for a given geographic region is the same for to all entities being evaluated, the actual weather database may be hyperlinked to each forecast database.

Figure 8:
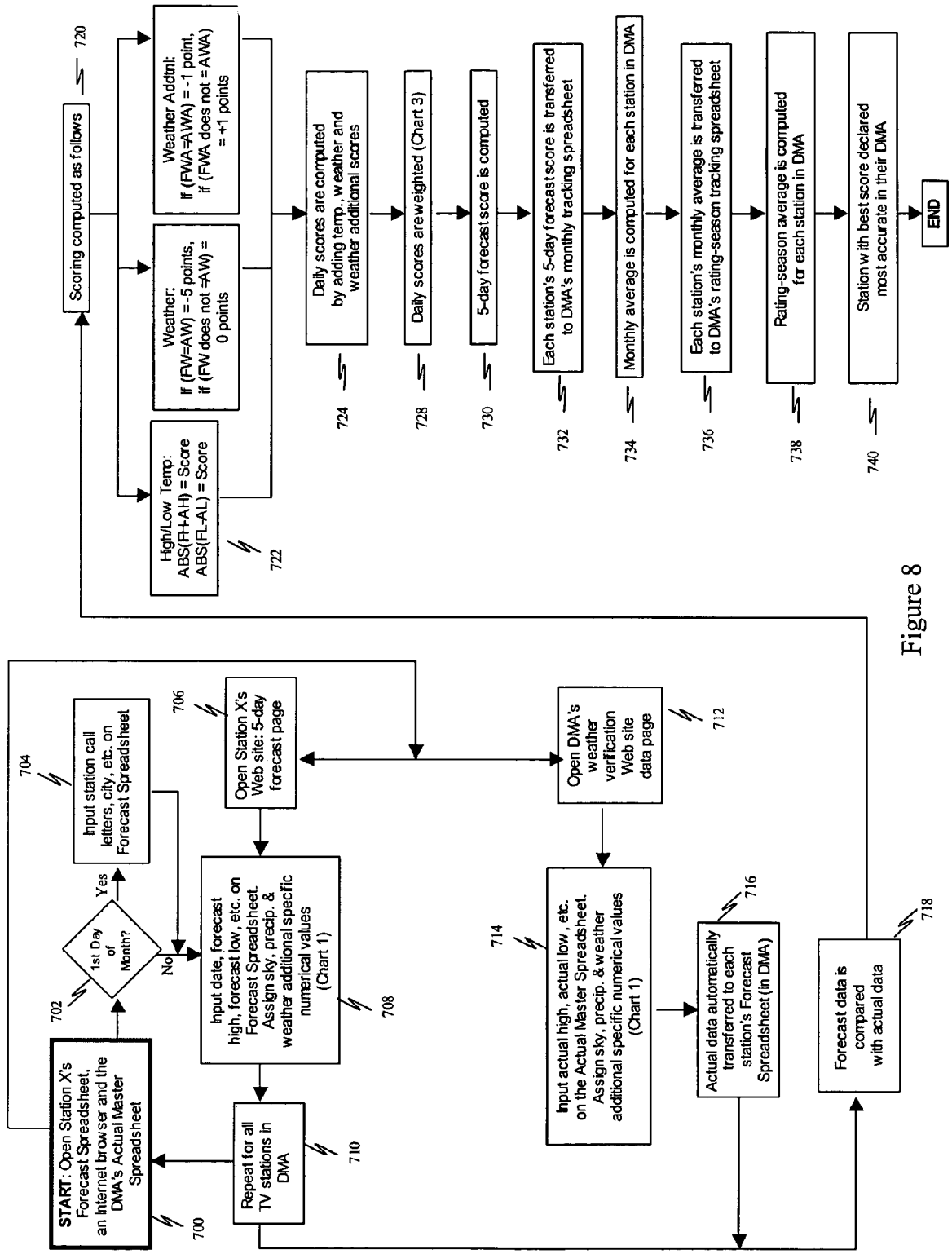
FIG. 8 is a flowchart describing the operation of a system for practicing the weather verification process of FIG. 1 which utilizes a spreadsheet program.
Figures 9A, 9B:
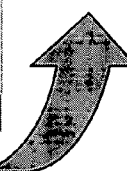
FIG. 9 is an display screen showing an exemplary daily forecast spreadsheet (Diagram A) and an exemplary actual master spreadsheet (Diagram B) of the system of FIG. 8.

As shown in FIG. 9A, each television station has a daily forecast spreadsheet for every day of the month. Referring to the flowchart in FIG. 8, the operator begins by opening the appropriate daily forecast spreadsheet, the DMA actual master spreadsheet and an Internet browser session (step 700). If it is the first day of the month the operator is asked (step 702) to input the television station call letters, affiliate name (NBC, ABC, etc), channel number, city and DMA (step 704).

The television station's five-day forecast data is entered in the cells of the spreadsheet of FIG. 9A. It is to be noted that the choice and use of color for the cells can be used to aid in the recognition and visual tracking of information. The following coding system is used: DXHF=Day X High Forecast (temperature), DXLF=Day X Low Forecast (temperature), DXWF=Day X Weather Forecast (sky or precipitation), DXWAF=Day X Weather Additional Forecast (snow depth, wind, fog, or severe thunderstorm). This process of opening daily forecast spreadsheets, locating a television station's five-day forecast web page, assigning specific values to abstract forecast data elements and entering specific values for forecast data elements in the forecast spreadsheet is completed for each television station in a DMA 710.

A television station's five-day forecast is obtained by locating the station's five-day weather forecast page on the television station's website 706. The forecast data may then be entered into the daily forecast spreadsheet 708. The five-day forecast data may include the forecast data elements previously discussed. Also, as previously discussed, the forecast data elements may be specific or abstract.

While there are many methods available for converting non-numerical data to a usable format, a preferred conversion format that has been used with the spreadsheet method of FIG. 8 is set forth in Chart 5:

CHART 5

| Abstract Weather Event | Assigned Specific Numerical Value |
|---|---|
| Sunny (Clear) | 1 |
| Partly Cloudy | 2 |
| Mostly Cloudy | 3 |
| Cloudy | 4 |
| Rain | 5 |
| Thunderstorm | 6 |
| Snow | 7 |
| Mixed | 8 |
| Snow 0.1" to 1.0" | 9 |
| Snow 1.1" to 3.0" | 10 |
| Snow 3.1" to 6.0" | 11 |
| Snow >6.0" | 12 |
| Ice | 13 |
| Windy | 14 |
| Fog | 15 |
| Severe Thunderstorm | 16 |

Referring again to FIG. 8, the actual (observed) weather conditions that transpire in a DMA are obtained from the National Weather Service or other reporting agency by locating the website that contains the desired weather statistics (step 712) as previously described. Every DMA has its own actual master spreadsheet for each month of the year (FIG. 9B). The actual data is then input into the DMA's Actual Master spreadsheet 714. As previously described, the actual (observed) data may include the weather condition data elements previously described. Also as previously described, the actual weather condition data elements may be specific or abstract. Moreover as previously described, all actual weather condition data elements are converted, as necessary, to a homogeneous numerical format.

While there are numerous interpretations of observed weather conditions (sky cover, precipitation and other weather phenomena), a set of definitions that has been used with the spreadsheet method of FIG. 8 is set forth in Chart 6:

CHART 6

| Actual Weather Condition | Definition |
|---|---|
| Sunny | Greater than 75% of possible sunshine, or 0 to 0.2 sky cover (midnight to midnight). |
| Partly Cloudy | 35% to 75% possible sunshine, or 0.3 to 0.6 sky cover (midnight to midnight). |
| Mostly Cloudy | 15% to 34% possible sunshine, or 0.7 to 0.8 sky cover (midnight to midnight). |
| Cloudy | Less than 15% possible sunshine, or 0.9 to 1.0 sky cover (midnight to midnight). |
| Rain | One-hundredth of one inch (.01") or greater during daylight and/or evening hours. |
| Snow | One-tenth (0.1") accumulation or greater. See note immediately below this chart for further explanation of snow. |
| Ice | Sleet or freezing rain is predominant weather event during daylight hours and/or evening hours. |
| Mixed | A mixture of rain, sleet, freezing rain or snow during daylight hours and/or evening hours. |
| Windy | Average (daylight hours) wind speed is 14 mph or greater, or five consecutive (daylight) hours with wind gusts of 20 mph or greater. |
| Fog | Visibility one-half mile or less for at least four daylight hours. |
| Severe Thunderstorm | Follows National Weather Service criteria: wind gust of 58 mph or stronger, or hail three quarters of an inch (¾") or larger. |

According to the definition of snow used in Chart 6, the amount is the storm total for the forecast period. For example, a television station may forecast one to three inches of snow today with a storm total of eight inches by tomorrow morning. For maximum scoring in this example, the Day 1 Weather Forecast and Day 1 Weather Additional Forecast would be: Snow, 1.1" to 3.0" and the Day 2 Weather Forecast and Day 2 Weather Additional Forecast would be: Snow, >6.0".

As noted above, in at least one embodiment, the spreadsheet application provides multiple sheets to act as forecast databases for each forecast entity being evaluated. Because the actual weather for a given geographic region is the same for all forecast entities within that geographic region, generally only one sheet is required to act as an actual weather database for that geographic region. Once the actual weather data has been entered into the DMA's Actual Master spreadsheet, the data is automatically transferred into each television station's daily forecast spreadsheet (step 716). This automatic transfer of data can be facilitated by hyperlinks. The actual data populates the corresponding fields in each station's daily forecast spreadsheet through a series of hyperlinks (FIG. 9). The following coding system is used in FIG. 9A: DXHA=Day X High Actual (temperature), DXLA=Day X Low Actual (temperature), DXWA=Day X Weather Actual (sky or precipitation), DXWAA=Day X Weather Additional Actual (snow depth, wind, fog, or severe thunderstorm).

At this point, specific values for the forecast data elements and actual (observed) weather condition data elements have been entered into a television station's daily forecast spreadsheet. Further, all data elements, including abstract types, are represented numerically. The specific value of each forecast data element (forecast-high temperature, forecast low temperature, forecast sky condition, forecast precipitation and forecast other weather phenomena) is compared with the specific value of each corresponding actual weather condition data element (actual high temperature, actual low temperature, actual sky condition, actual precipitation and actual other weather phenomena 718). High temperature, low temperature, weather and weather additional data element points are computed 720 (refer to Appendix A, which sets forth the algorithms for the spreadsheet application) with the results appearing in FIG. 9A, Columns C, F, I and L respectively. While there are numerous methods available to compute scores (step 722), the present invention may use the system proposed in Chart 7:

CHART 7

| Item | Scoring Process |
|---|---|
| High and Low Temperature | Absolute value of the forecast temperature minus the actual temperature. |
| Weather | Minus five points when the forecast weather is the same as the actual weather. Zero points otherwise. |
| Weather Additional | Minus one point when the forecast weather additional is the same as the actual weather additional. Plus one point otherwise. When no weather additional is forecast and a weather additional event occurs, one point is assessed. |
| Missing Temperature | Plus seven points. |
| Missing Weather | Zero points. |
| Missing Weather Additional | Plus one point. |

When comparing two or more scores in this scoring system, the lowest evaluated score indicates the most accurate forecast.

Daily scores are computed by adding temperature, weather and weather additional data element points (step 724), then multiplying the total by a weighting factor (step 728) (refer to Appendix A). The daily scores are weighted because the first and second days of an extended forecast are often more important to most people than the fourth or fifth days of an extended forecast. While there are numerous methods available to weight scores, a weighting method that has been used with the spreadsheet method of FIG. 8 is set forth in Chart:

CHART 8

| Forecast Day | Weighting Factor |
| --- | --- |
| One | Daily point total multiplied by 2 |
| Two | Daily point total multiplied by 1.25 |
| Three | Daily point total multiplied by 1 |
| Four | Daily point total multiplied by 0.75 |
| Five | Daily point total multiplied by 0.5 |

The weighted five-day score is then computed (step 730). The daily scores (shown in FIG. 9A in cells M10, M14, M18, M22, M26 and M30) are averaged and a five-day score is computed 730 (refer to Appendix A). The five-day score is shown in FIG. 9A in cell M32.

Figure 10:
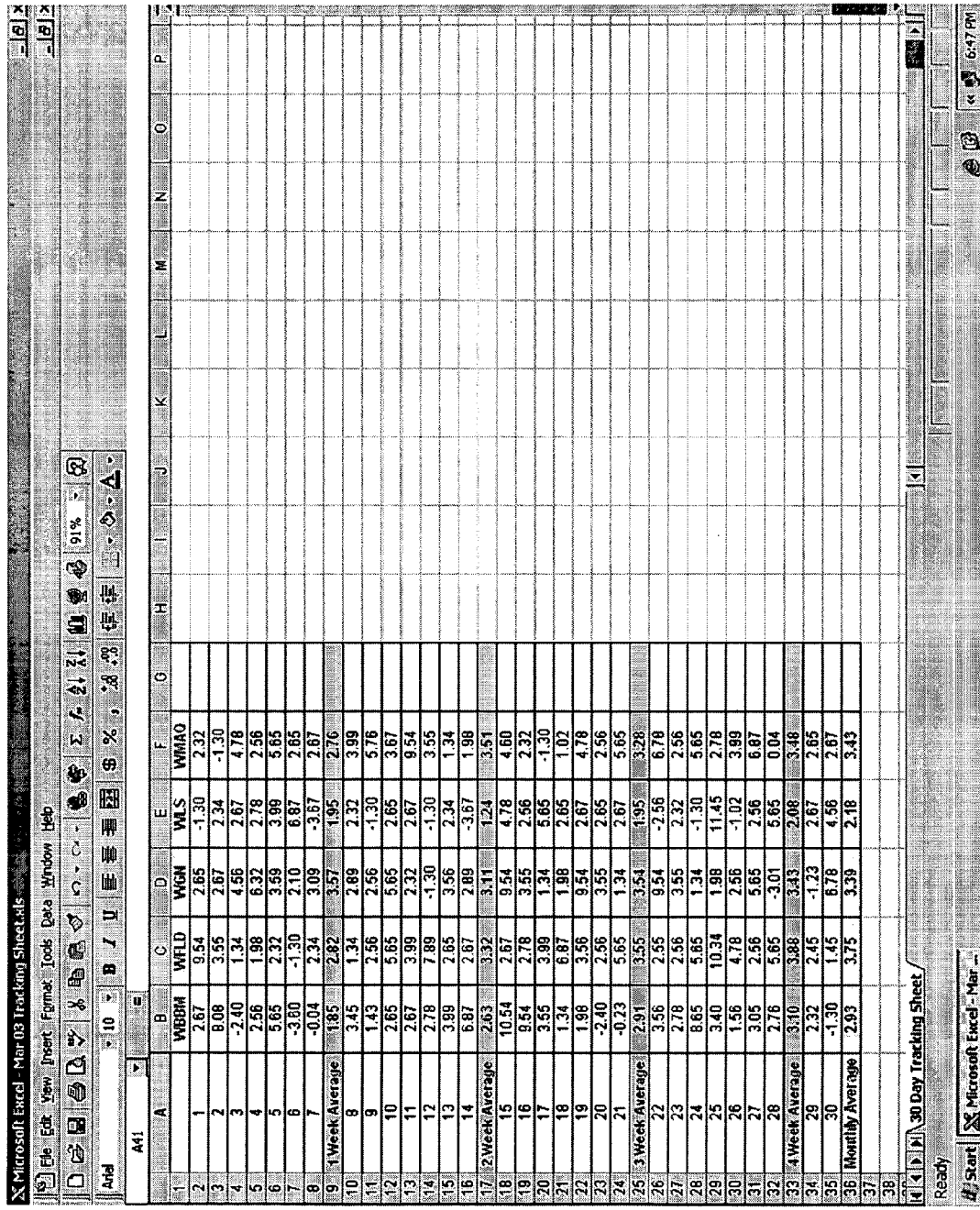
FIG. 10 is a display screen showing a typical monthly tracking spreadsheet of the system of FIG. 8.

The five-day score is automatically transferred to the DMA's monthly tracking spreadsheet (FIG. 10) through a series of hyperlinks (step 732). The monthly tracking spreadsheet takes the data received from all forecast sheets within its DMA and calculates a running weekly and monthly average score (step 734). To ensure that the DMA's monthly tracking spreadsheet score is accurate, the five-day scores for a station are also are averaged on the forecast spreadsheet on the last day of each month (refer to Appendix A). This monthly score should be equal to the DMA's monthly tracking spreadsheet score for that particular station.

The monthly scores are then automatically transferred to the DMA's rating-season tracking spreadsheet (FIG. 11) through a series of hyperlinks (step 736). The rating-season tracking spreadsheet takes the data received from all monthly tracking spreadsheets within its DMA and calculates a rating-season score 738. Typically, the television station with the best score is declared the most accurate in a particular DMA 740. As previously described, The most accurate television station in each DMA may be offered the opportunity to purchase exclusive use of the verifying agency's name, logo and/or seal of approval for a specific length of time. Also as previously described, in the event of a best score tie (two stations with identical scores), other factors may aid in determining which station receives the verifying agency's seal of approval.

An example of macros used for the spreadsheet embodiment described herein are set forth in Appendix B.

From the foregoing, it can be seen that the apparatus of the present invention possesses numerous advantages. While the invention has been described with reference to preferred methods and embodiments, it will be understood that various alterations, changes and improvements may be made and equivalents may be substituted for the steps thereof and elements thereof without departing from the scope of the present invention. In addition, many modifications may be made to adapt to a particular situation or material to the teachings of the invention without departing from the essential scope thereof. Such alterations, changes, modifications, and improvements, though not expressly described above, are nevertheless intended and implied to be within the scope and spirit of the invention. Therefore, it is intended that the invention not be limited to the particular methods and embodiments disclosed as the best mode contemplated for carrying out this invention, but that the invention will include all methods and embodiments falling within the scope of the appended claims.

Appendix—Algorithms

Data Element Points:
1. To compute high temperature data element points:
   =IF((A10−B10>500),7,ABS(A10−B10))
2. To compute low temperature data element points:
   =IF((D14−E14>500),7,ABS(D14−E14))
3. To compute weather data element points:
   =IF(G10=H10,−5,0)
4. To compute weather additional data element points:
   =IF((J10−K10=82),0,(IF((J10−K10)<1, IF(J10=K10,−1, 1),1)))

Weighting Factors:
5. To compute Day 1 daily score:
   =2*(C10+F10+I10+L10)
6. To compute Day 2 daily score:
   =1.25*(C14+F14+I14+L14)
7. To compute Day 3 daily score:
   =C18+F18+I18+L18
8. To compute Day 4 daily score:
   =0.75*(C22+F22+I22+L22)
9. To compute Day 5 daily score:
   =0.5*(C26+F26+I26+L26)

Five-Day and Monthly Average Scores:
10. To compute five-day average score:
    =AVERAGE(M10,M14,M18,M22,M26,M30)
11. To compute monthly average score:
    First, add daily scores. Day 1–10 sum placed in cell A33:
    =SUM('W:\W×Rate\52 Chicago Test\WBBM\4 April\ [Day 1.xls]Day 1'!$M$32,'W:\W×Rate\52 Chicago Test\WBBM\4 April\ [Day 2.xls]Day 2'!$M$32,'W:\W×Rate\52 Chicago Test\WBBM\4 April\ [Day 3.xls]Day 3'!$M$32,'W:\W×Rate\52 Chicago Test\WBBM\4 April\ [Day 4.xls]Day 4'!$M$32,'W:\W×Rate\52 Chicago Test\WBBM\4 April\ [Day 5.xls]Day 5'!$M$32,'W:\W×Rate\52 Chicago Test\WBBM\4 April\ [Day 6.xls]Day 6'!$M$32,'W:\W×Rate\52 Chicago Test\WBBM\4 April\ [Day 7.xls]Day 7'!$M$32,'W:\W×Rate\52 Chicago Test\WBBM\4 April\ [Day 8.xls]Day 8'!$M$32,'W:\W×Rate\52 Chicago Test\WBBM\4 April\ [Day 9.xls]Day 9'!$M$32,'W:\W×Rate\52 Chicago Test\WBBM\4 April\ [Day 10.xls]Day 10'!$M$32)
    Day 2–20 sum placed in cell B33:
    =SUM('W:\W×Rate\52 Chicago Test\WBBM\4 April\ [Day 11.xls]Day 11'!$M$32,'W:\W×Rate\52 Chicago Test\WBBM\4 April\[Day 12.xls]Day 12'!$M$32,'W:\W×Rate\52 Chicago Test\WBBM\4 April\[Day 13.xls]Day 13'!$M$32,'W:\W×Rate\52 Chicago Test\WBBM\4 April\[Day 14.xls]Day 14'!$M$32,'W:\W×Rate\52 Chicago Test\WBBM\4 April\[Day 15.xls]Day 15'!$M$32,'W:\W×Rate\52 Chicago Test\WBBM\4 April\[Day 16.xls]Day
16'!$M$32,'W:\W×Rate\52 Chicago Test\WBBM\4 April\[Day 17.xls]Day
17'!$M$32,'W:\W×Rate\52 Chicago Test\WBBM\4 April\[Day 18.xls]Day
18'!$M$32,'W:\W×Rate\52 Chicago Test\WBBM\4 April\[Day 19.xls]Day
19'!$M$32,'W:\W×Rate\52 Chicago Test\WBBM\4 April\[Day 20.xls]Day
20'!$M$32)

Day 3–30 sum placed in cell C33:
=SUM('W:\W×Rate\52 Chicago Test\WBBM\4 April\[Day 21.xls]Day
21'!$M$32,'W:\W×Rate\52 Chicago Test\WBBM\4 April\[Day 22.xls]Day
22'!$M$32,'W:\W×Rate\52 Chicago Test\WBBM\4 April\[Day 23.xls]Day
23'!$M$32,'W:\W×Rate\52 Chicago Test\WBBM\4 April\[Day 24.xls]Day
24'!$M$32,'W:\W×Rate\52 Chicago Test\WBBM\4 April\[Day 25.xls]Day
25'!$M$32,'W:\W×Rate\52 Chicago Test\WBBM\4 April\[Day 26.xls]Day
26'!$M$32,'W:\W×Rate\52 Chicago Test\WBBM\4 April\[Day 27.xls]Day
27'!$M$32,'W:\W×Rate\52 Chicago Test\WBBM\4 April\[Day 28.xls]Day
28'!$M$32,'W:\W×Rate\52 Chicago Test\WBBM\4 April\[Day 29.xls]Day
29'!$M$32,M32)

Now, to compute the average monthly score for a 30 day month:
=(A33+B33+C33)/30

Appendix B—Macros

Module 1 (1 page):
Macro used to create a new city to be evaluated in the weather verification system.

Module 2 (23 pages):
Macro used to create a new city to be evaluated in the weather verification system.

Module 3 (1 page):
Macro used to create a new city to be evaluated in the weather verification system.

Module 4 (3 pages):
Macro used to update entire month of daily five-day scores. Once updated, the daily five-day scores are automatically sent to the monthly tracking sheet via hyperlinks.

I claim:

1. A method for evaluating accuracy of a weather forecasting entity, the method comprising:
obtaining a weather forecast for the entity for a given geographic region and for a given forecast time period, the forecast comprising a set of one or more forecast data elements;
converting the set of forecast data elements to a set of one or more numerical values;
obtaining a set of one or more actual weather condition data elements for the given geographic region and for a given forecast time period;
converting the set of actual weather condition data elements to a set of one or more numerical values;
comparing the set of actual weather condition numerical values with the set of forecast numerical values; and
computing a forecast accuracy score based on the comparison of the set of actual weather condition numerical values and the set of forecast numerical values.

2. The method of claim 1 wherein each of the set of forecast data elements and the set of actual weather condition data elements includes specific elements.

3. The method of claim 1 wherein each of the set of forecast data elements and the set of actual weather condition data elements includes abstract elements.

4. The method of claim 1 wherein the weather forecasting entity is a television station that broadcasts in at least a portion of the geographical area.

5. The method of claim 1 wherein the set of forecast data elements includes one or more of forecast high temperature, forecast low temperature, forecast sky condition, forecast precipitation type, forecast precipitation timing and forecast other weather phenomena.

6. The method of claim 5 wherein the forecast sky condition data element is selected from the group consisting of sunny, partly cloudy, mostly cloudy and cloudy.

7. The method of claim 5 wherein the forecast precipitation type data element is selected from the group consisting of rain, snow, ice, and mixed.

8. The method of claim 5 wherein the forecast other weather phenomena data element is selected from the group consisting of snow depth, strong wind, dense fog and severe thunderstorm.

9. The method of claim 1 wherein a forecast accuracy score is computed based on high temperature, low temperature, weather and weather additional data element points.

10. The method of claim 1 wherein the forecast time period is about one day.

11. The method of claim 1 further comprising:
obtaining one or more additional forecasts for the given geographic region and for one or more additional forecast time periods, the additional forecasts each comprising a set of one or more forecast data elements;
converting the one or more additional sets of forecast data elements to one or more corresponding sets of forecast numerical values;
obtaining a set of one or more actual weather condition data elements for the given geographic region and for each of the one or more additional forecast time periods;
converting the one or more sets of additional actual weather condition data elements to corresponding additional sets of actual weather condition numerical values; and
comparing the one or more additional sets of actual weather condition numerical values with the corresponding one or more sets of forecast numerical values; and
wherein computing the forecast accuracy score is further based on the comparison of the additional sets of actual weather condition numerical values with the corresponding additional sets of forecast numerical values.

12. The method of claim 11 wherein computing the forecast accuracy score comprises calculating a periodic score for each of the comparisons of one or more additional sets of actual weather condition numerical values with the corresponding one or more sets of forecast numerical values and weighting each of the periodic scores to obtain a weighted score.

13. The method of claim 12 wherein weighting the periodic score is based on the recency of the score.

14. The method of claim 11, wherein each of the forecast time periods is about one day and the forecast time periods cover a total period of about four days.

15. The method of claim 1 further comprising:
obtaining a weather forecast for a second weather forecasting entity for the given geographic region and period of time, the second forecast comprising a second set of forecast data elements;
converting the second set of forecast data elements to a second set of one or more forecast numerical values;
comparing the set of actual weather condition numerical values with the second set of forecast numerical values;
computing a second forecast accuracy score based on the comparison of the set of actual weather condition numerical values and the second set of forecast numerical values; and
comparing the forecast accuracy score with the second forecast accuracy score.

16. The method of claim 15 wherein each of the first and second weather forecasting entities is a television station that broadcasts in at least a portion of the geographical area.

17. The method of claim 15 wherein each of the weather forecasting entities is a television station that broadcasts in at least a portion of the geographical area.

18. The method of claim 15, wherein the period of time is about one day.

19. A system for evaluating accuracy of a weather forecasting entity, the system comprising:
a database operable to store data including:
a set of one or more forecast weather data elements associated with a given geographic region and period of time and a forecasting entity;
a set of one or more actual weather condition data elements associated with the given geographic region and period of time; and
rules for converting the forecast weather data elements and the actual weather condition elements to a set of one or more numerical values;
an application program operable with the database to:
convert the forecast weather data elements to a set of one or more numerical values using the rules;
convert the set of actual weather condition data elements to a set of one or more numerical values using the rules;
compare the set of actual weather condition numerical values with the set of forecast numerical values; and
compute a forecast accuracy score based on the comparison of the set of actual weather condition numerical values and the set of forecast numerical values.

20. The system of claim 19 wherein each of the set of forecast data elements and the set of actual weather condition data elements includes specific elements.

21. The system of claim 19 wherein each of the set of forecast data elements and the set of actual weather condition data elements includes abstract elements.

22. The system of claim 19 wherein the weather forecasting entity is a television station that broadcasts in at least a portion of the geographical area.

23. The system of claim 19 wherein the set of forecast data elements includes one or more of forecast high temperature, forecast low temperature, forecast sky condition, forecast precipitation type, forecast precipitation timing and forecast other weather phenomena.

24. The system of claim 23 wherein the forecast sky condition data element is selected from the group consisting of sunny, partly cloudy, mostly cloudy and cloudy.

25. The system of claim 23 wherein the forecast precipitation type data element is selected from the group consisting of rain, snow, ice, and mixed.

26. The system of claim 23 wherein the forecast other weather phenomena data element is selected from the group consisting of snow depth, strong wind, dense fog and severe thunderstorm.

27. The system of claim 19 wherein a forecast accuracy score is computed based on high temperature, low temperature, weather and weather additional data element points.

28. The system of claim 19 wherein the forecast time period is part or all of a twenty-four hour period.

29. The system of claim 19, wherein a spreadsheet program comprises the application program.

30. The system of claim 19, wherein:
the database is operable to store a second set of forecast data elements associated with the given geographic region and period of time and with a second forecasting entity; and
the application program is operable with the database to:
convert the second set of forecast data elements to a second set of one or more forecast numerical values;
compare the set of actual weather condition numerical values with the second set of forecast numerical values;
compute a second forecast accuracy score based on the comparison of the set of actual weather condition numerical values and the second set of forecast numerical values; and
compare the forecast accuracy score with the second forecast accuracy score.

31. A computer system for evaluating the accuracy of weather forecasting entities for a given geographic region, the system comprising:
a central processing unit (CPU);
a forecast weather database operable with the CPU and comprising forecast data elements for a first weather forecasting entity and forecast data elements for a second weather forecasting entity;
an actual weather database operable with the CPU and comprising actual data elements;
at least one input device operable to input weather forecasting data elements into the forecast weather database;
the CPU being programmed to:
convert the forecast weather data elements to one or more numerical values;
convert the actual weather condition data elements to numerical values;
compare the actual weather condition numerical values with the set of forecast numerical values;
compute a forecast accuracy score for each of the first weather forecasting entity and the second weather forecasting entity based on the comparison of the actual weather condition numerical values and the forecast numerical values; and
compare the forecast accuracy score for the first weather forecasting entity with the forecast accuracy score for the second weather forecasting entity.

32. The computer system of claim 31 wherein the forecast weather data elements for the weather forecasting entities are for the same geographic region and period of time.

33. The computer system of claim 31 wherein the forecast data elements for at least one of the weather forecasting entities are entered in an online data entry system by the weather forecasting entity.

34. The computer system of claim 31 wherein the forecast weather data elements include one or more of forecast high temperature, forecast low temperature, forecast sky condition, forecast precipitation type, forecast precipitation timing and forecast other weather phenomena.

35. The computer system of claim 31 wherein the actual weather data elements include one or more of actual high temperature, actual low temperature, actual sky condition, actual precipitation type and timing and actual other weather phenomena.

* * * * *